O. O. THWING.
COMPOUND STUFFING BOX FOR RODS, STEMS, AND SHAFTS.
APPLICATION FILED MAY 9, 1908.

909,479.

Patented Jan. 12, 1909.

WITNESSES:
W. E. Allen
S. Brashears.

INVENTOR
Orrell O. Thwing
BY
E. S. Clark
Attorney

UNITED STATES PATENT OFFICE.

ORRELL O. THWING, OF FORT WAYNE, INDIANA.

COMPOUND STUFFING-BOX FOR RODS, STEMS, AND SHAFTS.

No. 909,479.    Specification of Letters Patent.    Patented Jan. 12, 1909.

Application filed May 9, 1908. Serial No. 431,915.

*To all whom it may concern:*

Be it known that I, ORRELL O. THWING, a citizen of the United States, residing at Fort Wayne, in the county of Allen and State of Indiana, have invented certain new and useful Improvements in Compound Stuffing-Boxes for Rods, Stems, and Shafts, of which the following is a specification.

This invention relates to valves, such as are installed in high pressure systems of gas distribution, and more particularly to means and devices for making tight joints in the passages for the stems of such valves, or for the rods or shafts of engines, pumps or compressors, to prevent the escape of fluid under pressure.

In the distribution of gas at a pressure of one pound to the square inch and over, much difficulty has been experienced, owing to the fact that in a short time the stuffing box, which is intended to prevent leakage at the point where the valve stem enters the valve cap, fails to properly perform its duty and in consequence a considerable leakage, varying according to the amount of pressure carried, occurs, causing not only an appreciable loss of gas, but also annoyance and danger from the gas which thereby escapes.

It is the object of this invention to prevent the above mentioned escape of gas, and consequent loss, danger and discomfort from valves to which it is applied, and to prevent the escape of any fluid or substance through stuffing boxes subjected to any pressure in connection with rods and stems, whether used for valves, engines, compressors, or any purpose whatever.

The matter constituting my invention will be defined in the claims.

For a detailed description of my invention reference is had to the accompanying drawings, in which—

Figure 1:
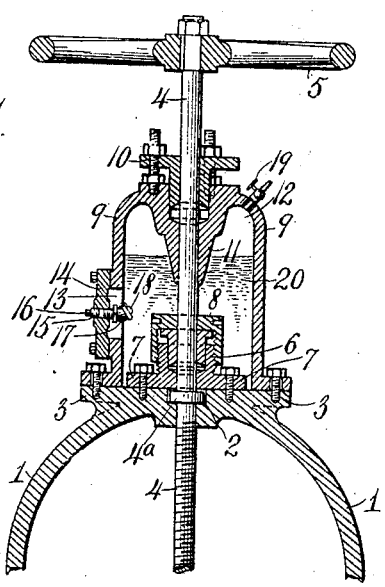
Figure 2:
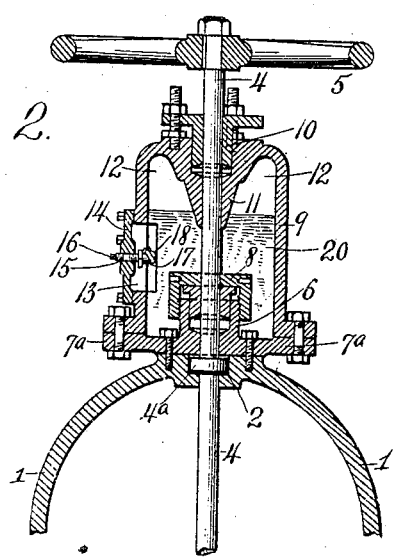

Figure 1 represents a vertical section of my seal chamber as made for new valves in the course of construction. Fig. 2 represents a vertical section of the same, modified for application to the caps of old valves.

I have illustrated my invention, which may be termed a seal-chamber, as applied to the casing and stem of a gate valve, but I wish it understood that the principal features of construction may be applied to the operating stems and rods of other devices or apparatus where tight joints are required to prevent leakage of fluid at the opening through which the rod, shaft or stem operates.

The cap 1 of the valve casing is provided at the top with the usual opening and recess 2 for the valve stem 4 and its fixed collar $4^a$, and to the upper end of the valve stem is secured a hand-wheel 5. In constructing new valves the cap is provided with a wide supporting flange 3 as shown in Fig. 1 for attachment of my seal-chamber or compound stuffing boxes. In this construction the interior stuffing box 6, having a flange 7, is secured by screw bolts to flange 3 and is provided with a screw follower 8. This illustrates only one of the well-known stuffing boxes which may be used in this location. The stuffing box serves as a cover and bearing for the fixed collar $4^a$ to prevent endwise movement of the valve stem.

The seal-chamber 9 is made with a lower open end provided with flanges by means of which it is secured by screw bolts to the flange 3. The upper end of chamber 9 is provided with an exterior stuffing box 10 around the valve stem 4, also with an inwardly extending annular boss or projection 11 adapted to project into a filling compound and form above the same a pressure pocket or chamber 12 which is completely isolated from the opening through which the valve stem passes. The wall of chamber 9 is provided with a hand-hole 13 which is closed by a plate 14 by means of suitable bolts and nuts for the purpose of obtaining access to the interior of the chamber when it is attached to a valve casing or other apparatus. The plate 14 is provided with a filling inlet 15 which is threaded to receive an external closing plug 16 and an interior short pipe 17 provided with a check valve 18. The wall at the top of the pressure chamber 12 can be provided if desired with a tapped opening in which is secured a plug or stop cock 19.

In the modification shown in Fig. 2 the present form of cap 1, constructed for receiving the usual single stuffing box, is provided with an especially constructed stuffing box 6 having an extended flange or base $7^a$ for supporting the seal-chamber 9. This extended flange or base is bolted to the top of the cap and to the flange of chamber 9. The seal-chamber or compound stuffing box is otherwise constructed as above described.

In applying my seal-chamber to a casing and a stem or rod the interior stuffing box 6 will be packed with any suitable packing material and the follower tightened and adjusted in a manner well-known to those skilled in the art. When first setting up the device the internal stuffing box may be packed or adjusted before attaching chamber 9 to the flange 3 or 7ª, but after the device has been in use the internal stuffing box may be adjusted or repacked by first removing the hand-hole plate 14 when access may be had for packing and adjusting the box. The seal-chamber and stuffing box having been constructed and all parts secured in place and attached to the casing of a valve or other apparatus, a filling compound in the nature of a lubricant, such as vaseline or cup grease may be forced through the filling inlet 15 into chamber 9 by means of a pump or other device, thereby compressing the contained air into the pocket or pressure chamber 12 and sealing the lower end of the tubular boss 11. The amount of such compression will be proportional to the pressure desired on the filling compound 20, such pressure being sufficient to prevent the escape or leakage of compressed gas or other fluid contained in or passing through the valve chamber or casing of other apparatus. If the pressure thus obtained should be insufficient and in consequence any gas or other fluid should escape through the internal stuffing box, the tendency of the escaping fluid would be to accumulate in the pocket or pressure chamber 12, thereby increasing the pressure on the filling compound until it is sufficient to prevent the escape of the fluid through the interior stuffing box. At the same time, this pressure will serve in causing the filling compound to move along the rod or stem to the packing material in both stuffing boxes, lubricating this material and assisting to preserve it and render it impervious to the gas or other fluid which it is intended to hold. A tapped opening provided with a plug or stop cock 19 can be placed in the top of the pocket or pressure chamber for the purpose of allowing the accumulated gas or other fluid to escape when it is desired to open up the main chamber for purposes of inspection or for the purpose of repacking or adjusting the stuffing boxes.

By leaving the external stuffing box unpacked while the filling compound is being discharged into the main chamber, it will be possible to determine by observation when the filling compound has passed the lower end of the annular boss or projection 11 which serves to isolate the pressure chamber from the rod, by reason of the fact that when the filling compound passes the bottom of this boss or projection, it will be forced by the pressure produced in the pressure chamber up into the opening through which the rod or stem passes and will appear in the external stuffing box 10. Other means of observing the level of the filling compound in the chamber can be used such as a gage glass or an opening through the side of the chamber which can be closed by means of a plug or cock, but I believe that the manner of ascertaining the amount of compound, as outlined above, is sufficient and it is desirable that as few projecting parts as possible be attached to the chamber in order to prevent possible trouble on account of their being broken or becoming out of order.

Having described my invention, what I claim, and desire to secure by Letters Patent, is:—

1. The combination with a casing and an operating rod passing through the same, of a stuffing box around the rod, a closed chamber inclosing the same, containing a fluid or semi-fluid filling and having an isolated pressure pocket or chamber for receiving gaseous fluid under pressure, and a stuffing box located upon the chamber, at the point where the rod or stem enters the chamber, for the purpose of preventing any escape of the fluid or semi-fluid filling, substantially as described.

2. The combination with a casing and an operating rod passing through the same, of a stuffing box around the rod, a closed chamber inclosing the same, a fluid or semifluid filling contained in the closed chamber, a pressure pocket above the filling and means for isolating it from the rod, substantially as described.

3. The combination with a casing and an operating rod passing through the same, of a stuffing box around the rod, a closed chamber inclosing the same, a fluid or semifluid filling contained in the closed chamber, a pressure pocket above the filling and means for isolating it from the opening for the rod in the wall of said chamber, substantially as described.

4. The combination with a casing and an operating rod passing through the same, of a stuffing box around the rod, a closed seal-chamber inclosing said stuffing box and having an inwardly projecting annular boss around the rod, and filling material in the closed chamber sealing the inner end of said boss and forming an isolated compression pocket or chamber, substantially as described.

5. The combination with a casing and operating rod passing through the same, of a seal-chamber secured to the casing around the rod, an inlet pipe having a check valve, opening into the chamber for admitting a fluid or semifluid filling under pressure, substantially as described.

6. The combination with a casing and operating rod passing through the same, of a seal-chamber secured to the casing around the rod and having an inwardly projecting annular boss around the rod and an inlet pipe, having a check valve, opening into the chamber for admitting a fluid or semifluid filling under pressure, substantially as described.

In testimony whereof I affix my signature in presence of two witnesses.

ORRELL O. THWING.

Witnesses:
F. V. CROSBY,
R. T. SPEER.